(12) United States Patent
Kato (10) Patent No.: US 6,935,749 B2
(45) Date of Patent: Aug. 30, 2005

(54) PROJECTION DISPLAY DEVICE (75) Inventor: Atsushi Kato, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 98 days.

(21) Appl. No.: 10/717,710

(22) Filed: Nov. 21, 2003

(65) Prior Publication Data

US 2004/0114250 A1 Jun. 17, 2004

(30) Foreign Application Priority Data

Dec. 2, 2002 (JP) ........................................ 2002-350462

(51) Int. Cl.[7] .............................................. G03B 21/14
(52) U.S. Cl. ............................ 353/38; 353/101; 353/87
(58) Field of Search ............................ 353/38, 101, 31, 353/34, 37; 349/5, 7, 8; 362/555, 231, 277, 800

(56) References Cited

U.S. PATENT DOCUMENTS 6,552,760 B1 * 4/2003 Gotoh et al. .................. 349/56
6,882,379 B1 * 4/2005 Yokoyama et al. ........... 349/61
2003/0090900 A1 * 5/2003 Kim et al. ................... 362/231

FOREIGN PATENT DOCUMENTS

JP       2001-249400        9/2001

* cited by examiner

Primary Examiner—William C. Dowling
(74) Attorney, Agent, or Firm—Young & Thompson (57) ABSTRACT In a projection display device, a plurality of light emitting diode elements are arranged to make up a light emitting diode element array, and a plurality of the light emitting diode element arrays are assembled to form a light source array. The device comprises a mechanism for moving the light source array; a light source driver circuit for turning on each of the light emitting diode elements within the light emitting diode element array; and a control circuit for controlling the lighting of each light emitting diode element. A first and a second fly-eye lens are each composed of a plurality of rectangular elemental lenses assembled in an array form, where the element lenses are identical in quantity to the light emitting diode element arrays. The light source moving mechanism reciprocates the overall light source array in a plane perpendicular to the optical axis of, the first fly-eye lens.

20 Claims, 8 Drawing Sheets

108 light source moving means
109 light source driver circuit   110 control circuit   111 driver circuit

PROJECTION DISPLAY DEVICE

BACKGROUND OF THE INVENTION

1. Field of the Invention

The present invention relates to a projection display device which employs a plurality of light emitting diodes for a light source.

2. Description of the Related Art

Conventional projection display devices typically comprise a single high-pressure mercury lamp as a light source which illuminates three or one two-dimensional light modulator, and a projection lens for displaying an image on a screen in an enlarged view.

The high-pressure mercury lamp for use as the light source is an all-round lamp which has a light emission characteristic over a range from ultraviolet to infrared, and is associated with a dichroic mirror, a rotary color filter or the like for selecting wavelength components of emitted white light required for color display to build an illumination optical system for irradiating the two-dimensional light modulator with the light.

The two-dimensional light modulator known in the art may be a transmission-type or a reflection-type liquid crystal panel, a digital mirror device (DMD), and the like. The foregoing projection display device employs a relatively large lamp for the light source because it is generally used in combination with a parabolic or an elliptic reflection mirror. In addition, due to the large amount of heat generated by the lamp, a cooling fan must be used to manage the temperature when the lamp is on. These requirements make it difficult to reduce the size and weight of the overall display device.

JP-2001-249400-A discloses a projection display device for solving the drawbacks of the conventional projection display device.

Figure 1:
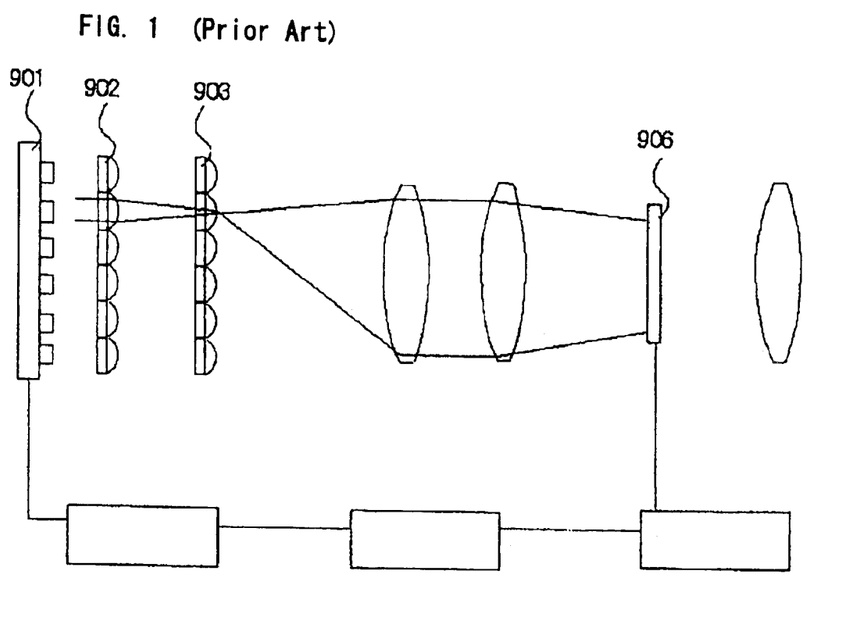
FIG. 1 is a schematic diagram illustrating the configuration of a projection display device described in JP-2001-249400-A.

FIG. 1 illustrates the configuration of the projection display device described in JP-2001-249400-A. As illustrated in FIG. 1, light emitting diode elements or laser diode elements, which are used for light source 901, are arranged in the form of array in correspondence to respective elemental lenses of a pair of fly-eye lenses 902, 903. The resulting optical system is capable of efficiently irradiating two-dimensional light modulator 906 with light flux from the individual light emitting elements. Here, two-dimensional light modulator 906 comprises a transmission-type liquid crystal panel.

Since the projection display device described in JP-2001-249400-A employs light emitting diode elements or laser diode elements for the light source, the overall display device can achieve a reduction in size, weight, and power consumption incurred by the light source. However, when light emitting diode elements or laser diode elements are used for a light source as is the case with the display device exemplified by JP-2001-249400-A, the light source implies an essential problem of ensuring a practical luminance with difficulties.

For example, high-pressure mercury lamps typically used for projection display devices provide a light emission efficiency in a range of 60 to 70 lumens/watt. On the other hand, light emitting diodes, for example, provide a light emission efficiency in a range of 10 to 40 lumens/watt which is significantly lower than that of the high-pressure mercury lamps.

Conventional projection display devices typically employ a light source lamp on the order of 150 to 250 watts of power, wherein the light source lamp of 150 watts, for example, emits light flux exceeding 9,000 lumens. On the other hand, even a recent high-performance light emitting diode of approximately one watt can merely provide the amount of light flux as low as 40 lumens even on the assumption that the light emitting diode provides a light emission efficiency of 40 lumens/watt. For achieving light flux of 9,000 lumens equivalent to a high-pressure mercury lamp, a trial calculation shows that the number of such light emitting diodes required for the purpose amounts to as many as 225.

In a conventional optical system using a fly-eye lens, light emitting elements correspond one-to-one to elemental lenses of the fly-eye lens. As such, the fly-eye lens is required to have the same number of elemental lenses as the number of light emitting elements used in the optical system. This type of light emitting diode has a diameter of approximately 10 mm including an assembled mold armor, so that if 225 light emitting diodes are arranged in matrix, the resulting light source array is unacceptably large, resulting in a failure in reducing the size of the overall projection display device.

SUMMARY OF THE INVENTION

The present invention has been made in view of the problems mentioned above, and it is an object of the invention to provide a projection display device which employs a plurality of light emitting diode elements arranged in array to exhibit a high light utilization efficiency without causing an increase in the size of a light source array.

A projection display device according to the present invention includes:

a light source array including a plurality of light emitting diode element arrays, each of which is composed of a plurality of light emitting diode elements as a light source for generating light flux;

an illumination optical system including a pair of first fly-eye lens and a second fly-eye lens which have the same optical axis;

a two-dimensional light modulator illuminated by the illumination optical system for modulating image light;

a projection lens for enlarging and projecting the modulated image light onto a screen; and a light source array moving mechanism for reciprocating the overall light source array within a plane perpendicular to the optical axis of the first fly-eye lens.

Each of the first and second fly-eye lenses may include a plurality of rectangular elemental lenses assembled in an array form, where the elemental lenses are identical in quantity to the light emitting diode element arrays.

A light emitting diode element within the light emitting diode element array of the light source array may be turned on when the center of the light emitting diode element substantially aligns with the optical axis of an elemental lens of the first fly-eye lens closer to the light source array, and the light emitting diode element may be turned off when the center thereof is not substantially in alignment with the optical axis.

A further projection display device according to the present invention includes:

a light source array including a plurality of light emitting diode element arrays, each of which is composed of a plurality of light emitting diode elements as a light source for generating light flux;

an illumination optical system including a pair of first fly-eye lens and a second fly-eye lens which have the same optical axis, and include a plurality of rectangular elemental lenses assembled in an array form, respectively, wherein the elemental lenses are identical in quantity to the light emitting diode element arrays;

a two-dimensional light modulator illuminated by the illumination optical system for modulating image light;

a projection lens for enlarging and projecting the modulated image light onto a screen;

a light source array moving mechanism for reciprocating the overall light source array within a plane perpendicular to the optical axis of the first fly-eye lens, such that a light emitting diode element within the light emitting diode element array of the light source array is turned on when the center of the light emitting diode element substantially aligns with the optical axis of an elemental lens of the first fly-eye lens closer to the light source array, and the light emitting diode element is turned off when the center thereof is not substantially in alignment with the optical axis; and control means for controlling to turn on/off each of the light emitting diode elements within the light emitting diode element arrays.

A further projection display device according to the present invention includes:

three light source arrays independent of one another and associated with R, B, G colors, respectively, each including a plurality of light emitting diode element arrays, each of which is composed of a plurality of light emitting diode elements;

an illumination optical system including first fly-eye lenses connected to the three light source arrays, respectively, a cross dichroic prism for combining light flux formed by the three light source arrays through the first fly-eye lenses associated therewith, and a second fly-eye lens, wherein each of the first fly-eye lenses and the second fly-eye lens includes a plurality of rectangular elemental lenses assembled in an array form, in the same quantity as the light emitting diode element arrays;

a two-dimensional light modulator illuminated by the illumination optical system for modulating image light;

a projection lens for enlarging and projecting the modulated image light onto a screen;

three light source array moving mechanisms associated with the three light source arrays, respectively, each for reciprocating the light source array associated therewith within a plane perpendicular to the optical axis of the first fly-eye lens associated therewith, such that a light emitting diode element within the light emitting diode element array in each of the three light source arrays is turned on when the center of the light emitting diode element substantially aligns with the optical axis of an elemental lens of the first fly-eye lens closer to each of the three light source arrays, and the light emitting diode element is turned off when the center thereof is not substantially in alignment with the optical axis; and control means for controlling to turn on/off each of the light emitting diode elements within the light emitting diode element arrays in the three light source arrays.

The light emitting diode element array may be composed of three or more light emitting diode elements.

When the light emitting diode element array is composed of three light emitting diode elements, the light emitting diode elements may be those which emit light in red, blue, and green, respectively.

Alternatively, when the light emitting diode element array is composed of three light emitting diode elements, the light emitting diode elements may be those which emit light in the same color.

When the light emitting diode element array is composed of more than three light emitting diode elements, three of the light emitting diode elements may be those which emit light in red, blue, and green, respectively, and the rest of the light emitting diode elements may be selected from light emitting diode elements which emit light in red, blue, and green.

Alternatively, when the light emitting diode element array is composed of more than three light emitting diode elements, light emitting diode elements in excess of three may be those which emit light in the same color.

Alternatively, the light emitting diode element array may be compose of three or more light emitting diode elements, wherein the light emitting diode elements making up the light emitting diode element array forming part of the light source array associated with R color may include light emitting diodes, all of which emit light in red, the light emitting diode elements making up the light emitting diode element array forming part of the light source array associated with B color may include light emitting diodes, all of which emit light in blue, and the light emitting diode elements making up the light emitting diode element array forming part of the light source array associated with G color may include light emitting diodes, all of which emit light in green.

As appreciated from the foregoing, since the projection display device according to the present invention has an optical system which has a plurality of light emitting diode elements associated with one elemental lens of the respective fly-eye lenses, the luminance can be enhanced without incurring an increase in the size of the light source array.

Further, the projection display device according to the present invention employs the moving mechanism for reciprocating the light emitting diode elements within the light source array, and light emitting diode elements in a number which is an integer multiple of the number of elemental lenses in the fly-eye lens. The light emitting diode elements are controlled to light in a pulsed manner at a predetermined duty ratio only when they substantially align with the optical axis of associated elemental lenses, thereby providing illumination light through efficient utilization of the same amount of light flux as that which is provided when all the light emitting diode elements of the light source array are lighting at all times, without incurring an increase in the size of the light source array. Thus, the resulting projection display device provides a higher luminance, though in a small size.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 2:
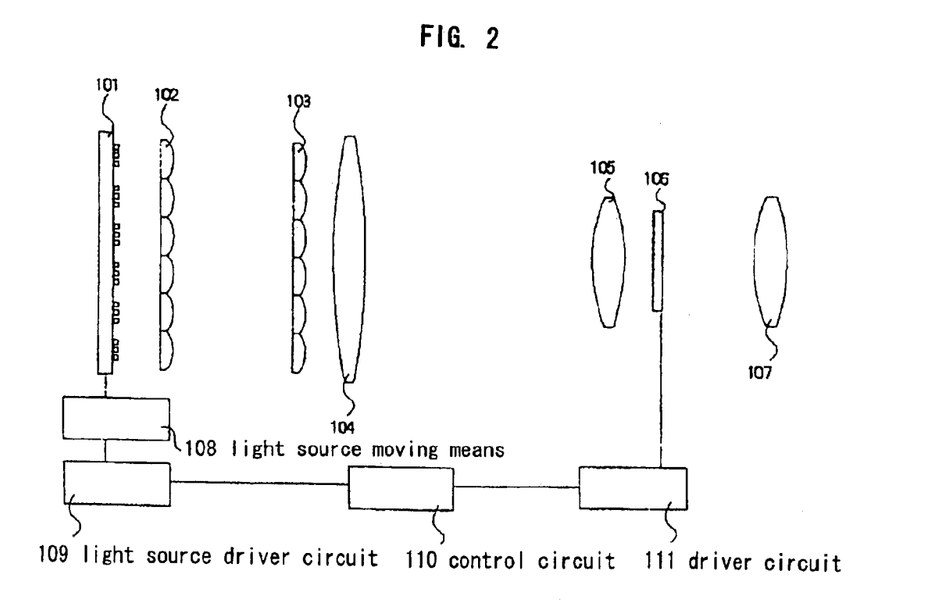
FIG. 2 is a schematic diagram illustrating the configuration of a projection display device according to one embodiment of the present invention.

FIG. 2 is a schematic diagram illustrating the configuration of a projection display device according to one embodiment of the present invention. As illustrated in FIG. 2, the projection display device according to this embodiment of the present invention comprises light source array 101 composed of a plurality of light emitting diodes arranged in arrays for use as a light source; a pair of first fly-eye lens 102 and second fly-eye lens 103; field lens 104; condenser lens 105; two-dimensional light modulator 106; projection lens 107; light source moving means 108 for reciprocating light source array 101; light source driver circuit 109 for turning on the respective light emitting diode elements in the plurality of light emitting diode element arrays which make up light source array 101; control circuit 110 for controlling the lighting of the respective light emitting diode elements; and driver circuit 111 for driving two-dimensional light modulator 106.

Figure 3:
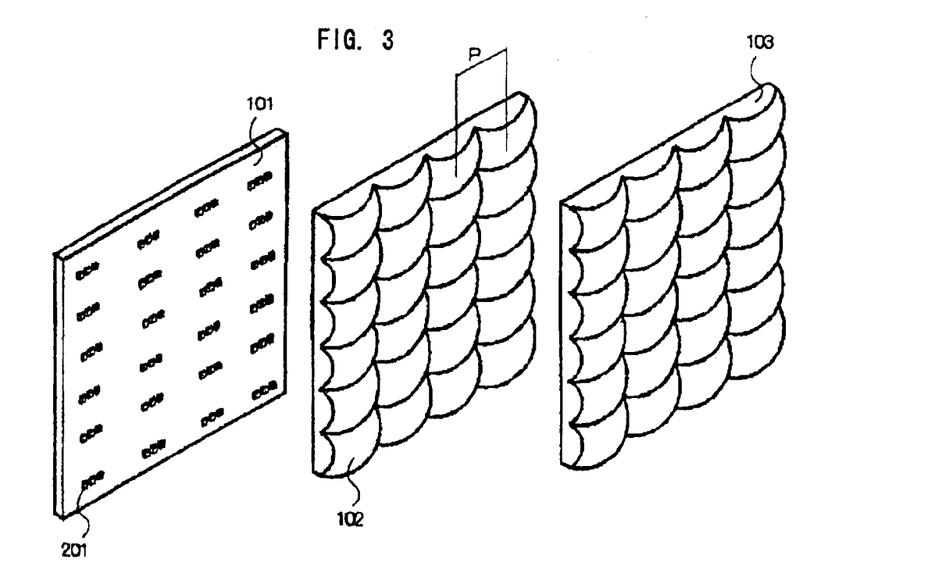
FIG. 3 is a perspective view illustrating light source array 101, first fly-eye lens 102, and second fly-eye lens 103 included in FIG. 2.

FIG. 3 is a perspective view illustrating light source array 101, first fly-eye lens 102, and second fly-eye lens 103 included in the projection display device of FIG. 2. As illustrated in FIG. 3, each of first fly-eye lens 102 and second fly-eye lens 103 is composed of a total of 24 planoconvex and rectangular elemental lenses arranged in an array of six vertical and four horizontal elemental lenses. Preferably, two-dimensional light modulator 106 illustrated in FIG. 2 has an effective display area, the aspect ratio of which is similar to that of the elemental lenses in first fly eye lens 102 and second fly eye lens 103. This is because the image of the light source having the contour of the elemental lenses in first fly-eye lens 102 focuses on the effective display area of two-dimensional light modulator 106, so that the aspect ratio offset from the similarity would impede effective utilization of the light from the light source.

In FIG. 3, light source array 101 is made up of light emitting diode element arrays 201, each of which is associated with one elemental lens of first fly-eye lens 102 and second fly-eye lens 103, and is composed of three light emitting diode elements for emitting light in colors R, B, G. Though depending on the size of the light emitting diode elements, each of light emitting diode element arrays 201 may be composed of a number of light emitting diode elements which accommodate in array pitch P of first fly-eye lens 102 and second fly-eye lens 103, and arranged in light source array 101.

In practice, the individual light emitting diode elements can be mounted at interval of approximately 0.5 mm. For example, assuming that the elemental lenses of first fly-eye lens 102 and second fly-eye lens 103 have a length of 3 mm and a width of 4 mm, and a light emitting diode element chip has a size of 0.3 mm, five light emitting diode elements are mounted at intervals of 0.5 mm in the horizontal direction, and each light emitting diode element array 201 can be composed of five light emitting diode elements. Further, if the light emitting diode element chip has a size smaller than 0.3 mm, each light emitting diode element array 201 can be composed of five or more light emitting diode elements up to n (n is an arbitrary integer equal to or larger than six).

Field lens 104 and condenser lens 105 serve as auxiliary optical elements for efficiently guiding light flux from second fly-eye lens 103 to two-dimensional light modulator 106. Two-dimensional light modulator 106 may be implemented by using a display device such as a reflection-type liquid crystal panel such as Lcos, DMD, and the like, other than a transmission-type TN liquid crystal panel. Two-dimensional light modulator 106 illustrated in FIG. 2 is implemented by a transmission-type liquid crystal panel, given as an example. In this implementation, a polarizer is required each in front of and behind the liquid crystal panel.

The following description will be made on the light emitting diode element. Generally, unlike discharge lamps, the light emitting diode element is capable of pulsed lighting, not to mention continuous lighting. Particularly, in the pulsed lighting, the power can be readily increased, while maintaining constant power consumption, by setting the duty ratio to a predetermined value.

More specifically, when the duty ratio of lighting time is set to ½, the instantaneous power can be increased by a factor of two. In a conventional illumination system using fly-eye lenses, the illumination system is established by arranging the fly-eye lenses having elemental lenses, such that each of the elemental lenses is corresponded to one of light emitting diode elements.

Therefore, the light emitting diode elements are also arranged at intervals corresponding to the pitch at which the respective elemental lenses are arranged on the fly-eye lenses. Since the elemental lenses of the fly-eye lenses have a size sufficiently larger than the associated light emitting diode elements, and extra light emitting diode elements can be interposed within a gap between adjacent light emitting diode elements.

However, the two-dimensional light modulator cannot be effectively illuminated simply by lighting the light emitting diodes thus arranged. Light flux from a light emitting diode element at a position deviated from the optical axis of an associated elemental lens of the fly-eye lenses does not provide a similar optical action to light flux from a light emitting diode element positioned to be in alignment with the optical axis.

Figure 4:
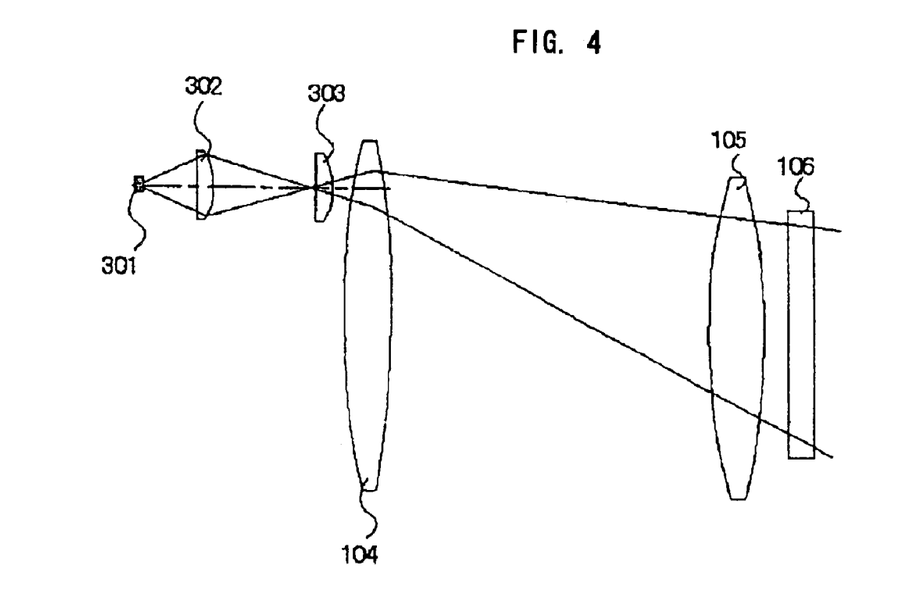
FIG. 4 is a schematic diagram illustrating an optical system in which light from light emitting diode elements transmits the fly-eye lenses and reaches a two-dimensional light modulator.

FIG. 4 is a schematic diagram illustrating an optical system in which light from light emitting diode elements transmits fly-eye lenses and reaches a two-dimensional light modulator. As illustrated in FIG. 4, the illumination using the fly-eye lenses relies on the following principles. Light flux from light emitting diode element 301, which is a light source, is incident on elemental lens 302 of a first fly-eye lens, focuses the contour of elemental lens 302 of the first fly-eye lens near elemental lens 303 of a second fly-eye lens. This image is focused on an effective display area of two-dimensional light modulator 106 through field lens 104 and condenser lens 105, and multiplexed with like images from other elemental lenses 303 of the second fly-eye lens. Therefore, if the center of the light emitting diode element deviates from the optical axis of elemental lens 302 of the first fly-eye lens, the resulting image cannot be efficiently focused on elemental lens 303 of the second fly-eye lens.

To address this problem, with the aid of a means for moving the light source array, only when the center of each light emitting diode element substantially aligns with the optical axis of an associated elemental lens of the fly-eye lens, the light emitting diode element situated substantially at the alignment position is lit at a predetermined duty ratio, thereby providing the same amount of light as that which is provided when all the light emitting diode elements of the light source array are lighting at all times.

More specifically, since m (m is an integer equal to or larger than three) light emitting diode elements can be functioned for each elemental lens, the resulting amount of light can be increased by a factor of m and provided as illumination light. Moreover, the overall light source array will not be increased in physical size. In addition, the light source array can be composed of light emitting diodes which emit light in the same color or a mixture of light emitting diode elements which emit light in R, B, G colors.

In the former case where the light source array is composed of light emitting diode elements which emit light in the same color, three light source arrays are provided for R, B, G colors, respectively. Then, light flux emitted in large amount from these three light source arrays may be combined by a prism or the like, while these light source arrays are controlled to light in time division, thereby enabling a color display for a single two-dimensional light modulator.

In the latter case where the light source array is composed of a mixture of light emitting diode elements which emit light in R, B, G colors, a single light source array is provided, and three light emitting diode elements, for example, are provided in correspondence to each of the elemental lenses of the first fly-eye lens, so that a set of three light emitting diode elements is used for emitting light in R, B, G colors, respectively. In one reciprocation of the light source array driven by the moving means, the optical axis of each elemental lens in the first fly-eye lens is aligned with the center of each light emitting diode element in the order of R=>B=>G=>G=>B=>R. A time-division color display can be achieved by controlling the light emitting diode elements at a predetermined duty ratio when they substantially align with the optical axis of their associated elemental lenses.

Figure 5:
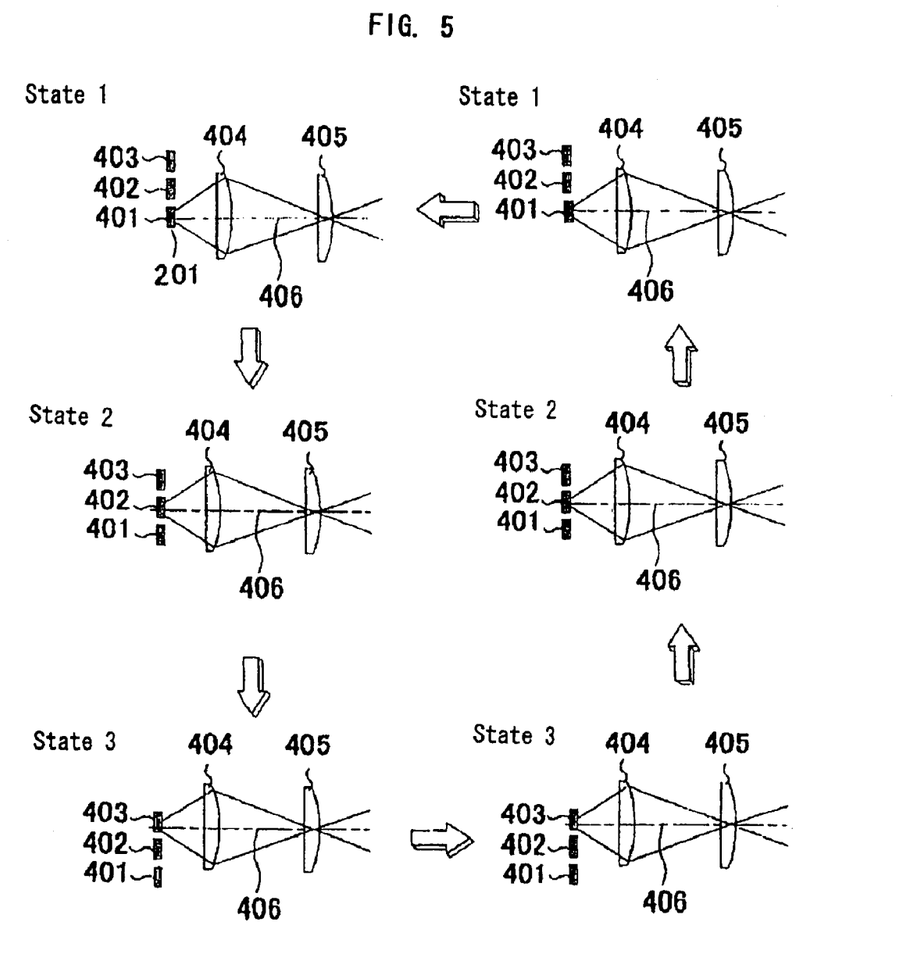
FIG. 5 is a diagram illustrating the operation of the projection display device according to a first embodiment of the present invention.

FIG. 5 is a diagram illustrating the operation of the projection display device according to a first embodiment of the present invention. FIG. 5 illustrates part of light source array 101 and part of elemental lenses in first fly-eye lens 102 and second fly-eye lens 103 in FIG. 2. In the following, the operation of the projection display device according to the first embodiment of the present invention will be described with reference to FIGS. 2, 3 and 5.

First, in an initial state, light emitting diode element array 201, having three R, G, B light emitting diode elements 401, 402, 403 arranged adjacent to each other, is placed in a positional relationship in which either of R, B, G light emitting diode elements substantially aligns with optical axis 406 of elemental lens 404 in first fly-eye lens 102.

Assume in FIG. 5 that red light emitting diode element 401 is positioned substantially in alignment with optical axis 406 of elemental lens 404 (upper left state 1). In this state, red light emitting diode element 401 is turned on by light source driver circuit 109 and control circuit 110 for controlling the lighting of the light emitting diode elements. Next, light source array 101 is moved by light source moving means 108 connected to light source array 101 such that the center of blue light emitting diode element 402 substantially aligns with optical axis 406 of elemental lens 404 (state 2). In this state, red light emitting diode element 401 is turned off, and blue light emitting diode element 402 is turned on instantaneously by light source driver circuit 109 and control circuit 110 for controlling the lighting of the light emitting diode elements. Subsequently, when green light emitting diode element 403 substantially aligns with optical axis 406 of elemental lens 404 (state 3), blue light emitting diode element 402 is turned off, and green light emitting diode element 403 is turned on instantaneously by light source driver circuit 109 and control circuit 110. With the foregoing sequence of operations performed on one way, light source array 101 is reciprocally moved by light source moving means 108 to form a cycle of state 1 (R)=>state 2 (B)=>state 3 (G)=>state 3 (G)=>state 2 (B)=>state 1 (R). Then, this reciprocal movement is repeated. Specifically, in FIG. 4, light source array 101 repeats the reciprocal movement by changing the state in the counter-clockwise direction from upper left state 1.

Light source moving means 108 may be implemented by any mechanism which can convert a rotary motion into a linear reciprocation, such as a linear stepping motor, an actuator, and the like. As mentioned above, FIG. 5 illustrates changes in the positional relationship between the light emitting diode elements and elemental lens in one cycle.

Figure 6:
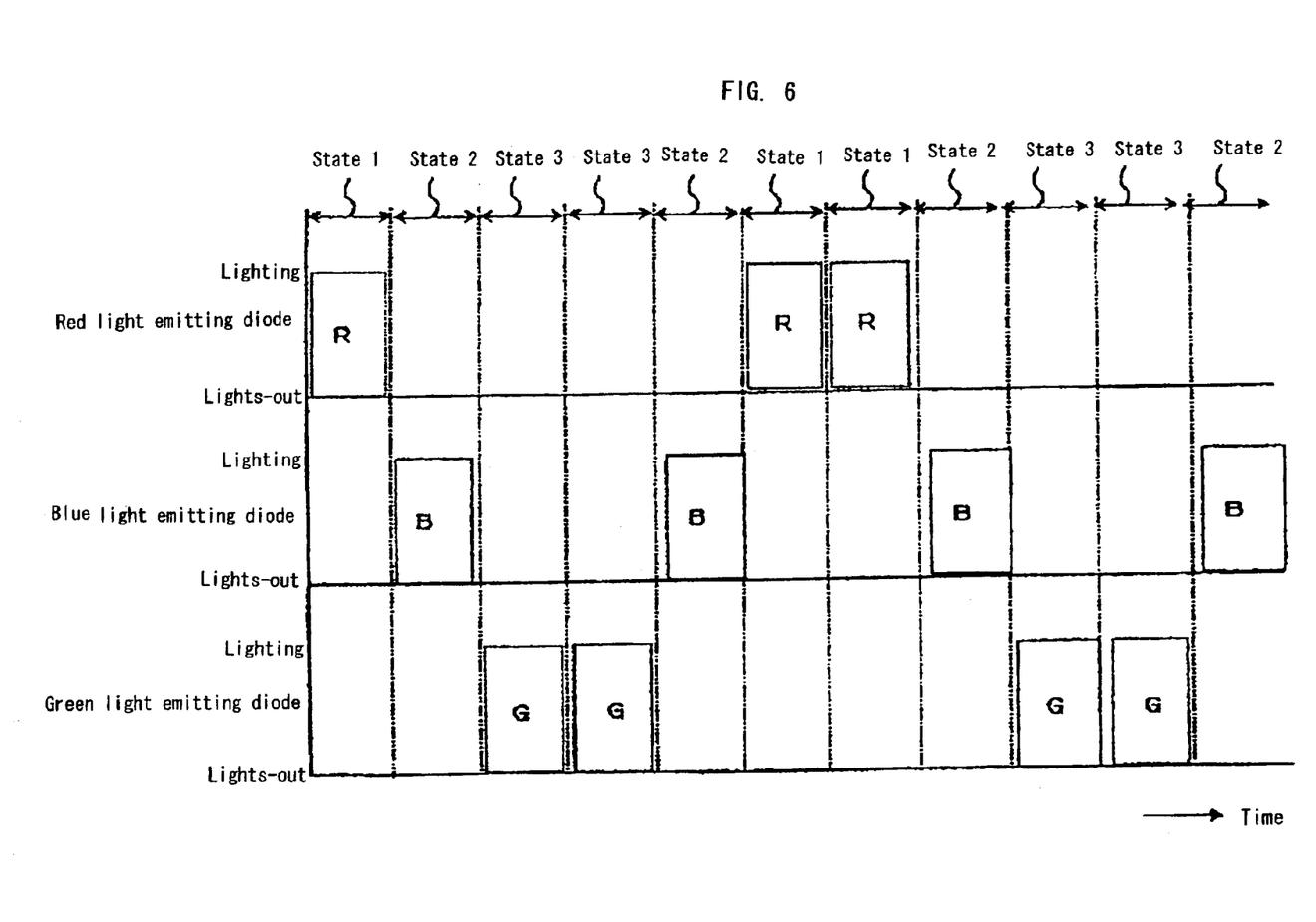
FIG. 6 is a timing chart showing lighting/lights-out timings for light emitting diode elements in respective colors in the projection display device according to the first embodiment of the present invention.

FIG. 6 is a timing chart showing lighting/lights-out timings for the light emitting diode elements in the respective colors in the projection display device according to the first embodiment of the present invention. As shown in FIG. 6, light flux generated in time division by repetitions of R=>B=>G=>G=>B=>R transmits first fly-eye lens 102 and second fly-eye lens 103, field lens 104, and condenser lens 105, and evenly illuminates the effective display area of two-dimensional light modulator 106 (liquid crystal panel).

For the light flux formed in time division, a color display can be accomplished by synchronizing control circuit 110 for controlling the lighting of the light emitting diode elements with driver circuit 111 associated with two-dimensional light modulator 106, so that an image is enlarged and projected onto a screen (not shown) by projection lens 107.

Figure 7:
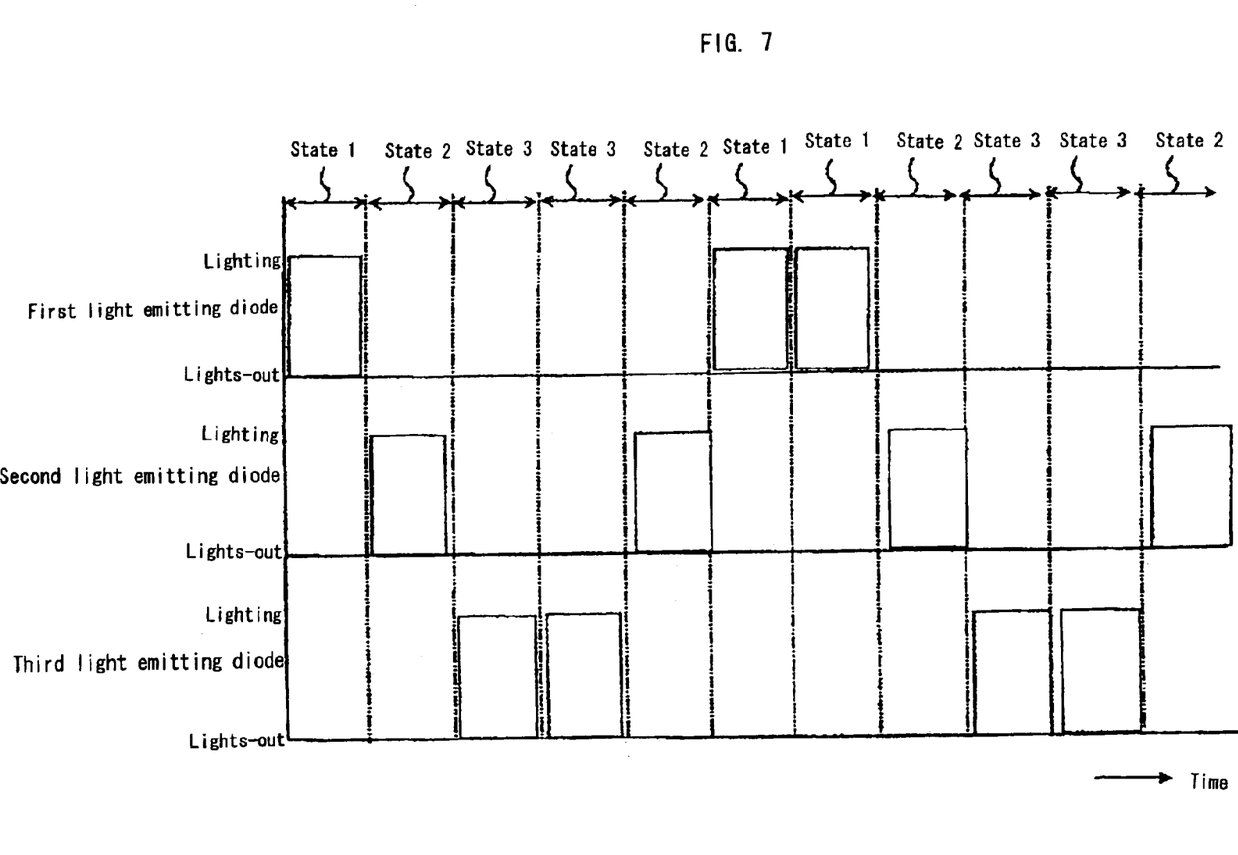
FIG. 7 is a timing chart showing lighting/lights-out timings for light emitting diode elements in the same color in a projection display device according to a second embodiment of the present invention.

Next, description will be made on the projection display device according to a second embodiment of the present invention. In the first embodiment, one cycle is formed with three light emitting diode elements for emitting light in different colors with respect to one elemental lens, however, one cycle can also be formed with light emitting diode elements for emitting light in the same color. In the second embodiment, three R, B, G light emitting diode elements 401, 402, 403 in the first embodiment illustrated in FIG. 5 are replaced with light emitting diode elements for emitting light in the same color. FIG. 7 is a timing chart showing lighting/lights-out timings for the light emitting diode elements in the same color in the projection display device according to the second embodiment of the present invention. As shown in FIG. 7, three light emitting diodes in the same color, employed herein as an example, are controlled by light source moving means 108 to light at a duty ratio of ⅓ when each of the light emitting diodes substantially aligns with the optical axis of the elemental lens, permitting two-dimensional light modulator 106 to be irradiated with the same amount of light as that provided when three light emitting diode elements are continuously lighting.

In this event, light emitting diodes in the same color may be employed such that light flux from the respective light emitting diodes is combined into a single optical path to produce illumination light. Each of the light emitting diode elements can increase the amount of light in accordance with the number of light emitting diodes corresponded to one elemental lens in one cycle.

Here, the light flux emitted from the light emitting diode elements is randomly polarized light. Therefore, when a TN liquid crystal panel is employed for two-dimensional light modulator 106, a polarized light conversion element is preferably used for unifying polarized light. The light utilization efficiency is improved by using the illumination light with unified polarized light. The polarized light conversion element may be implemented by a polarized beam splitter array known in the art, wherein this element may be disposed between second fly-eye lens 103 and field lens 104.

In the first and second embodiments described above, light emitting diode element array 201 is composed of three light emitting diode elements. However, as mentioned above, light emitting diode element array 201 can be composed of five light emitting diode elements. When five light emitting diode elements are used, a plurality of light diode elements in a certain color may be provided in consideration of white balance.

Figure 8:
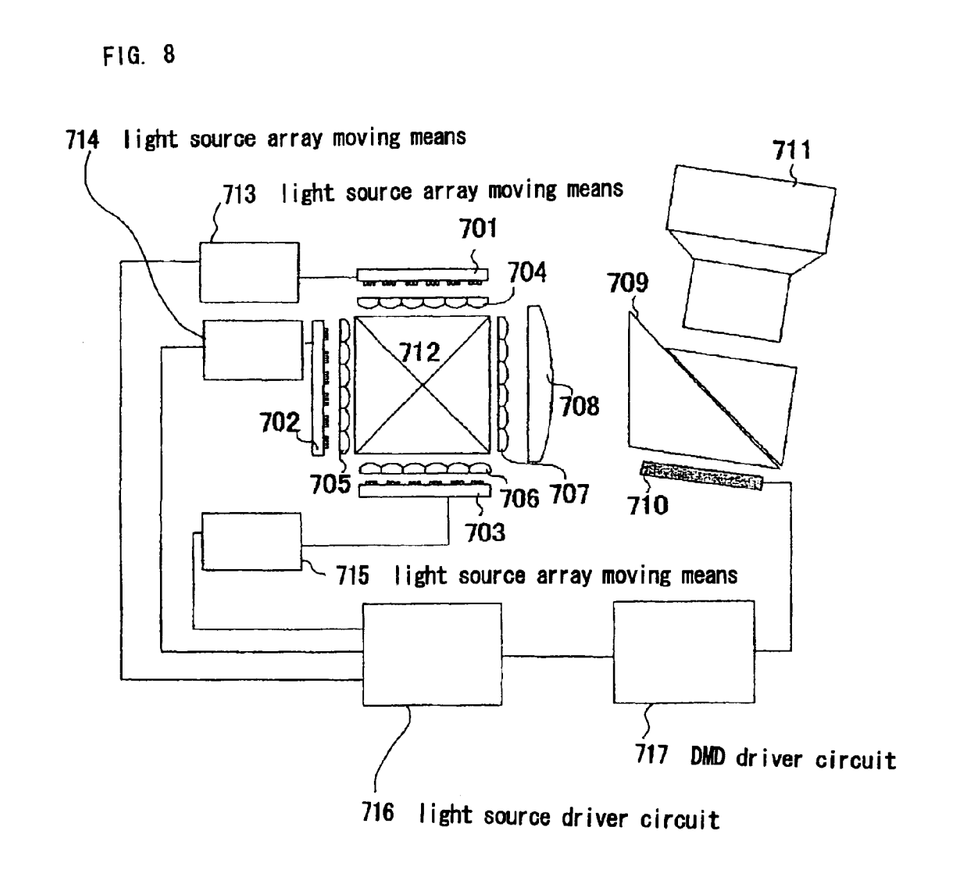
FIG. 8 is a block diagram illustrating the configuration of a projection display device according to another embodiment of the present invention.

FIG. 8 is a block diagram illustrating the configuration of a projection display device according to another embodiment of the present invention. This embodiment differs from the first embodiment in that independent light source arrays 701, 702, 703 are provided for R, B, G colors, respectively, such that light flux formed by each of the light source arrays is combined by cross dichroic prism 712 to produce light for illuminating a two-dimensional light modulator. Cross dichroic prism 712 is disposed in a space defined by first fly-eye lenses 704, 705, 706 and second fly-eye lens 707.

Light source arrays 701, 702, 703 are connected to light source array moving means 713, 714, 715, respectively, and light source driver circuit 716 controls to turn on/off light emitting diode elements in light source arrays 701, 702, 703. The two-dimensional light modulator is implemented by DMD 710 given as an example. Prism 709 is provided immediately in front of an incident plane of DMD 710. DMD 710 is driven by DMD driver circuit 717.

Since light source arrays 701, 702, 703 need to supply DMD 710 with color light flux in time division, the light flux must be generated in a sequence of R=>B=>G over time, for example, when light source array 701 is associated with R; 702 with B; and 703 with G. DMD 710 creates an image through pulse width modulation.

Figure 9:
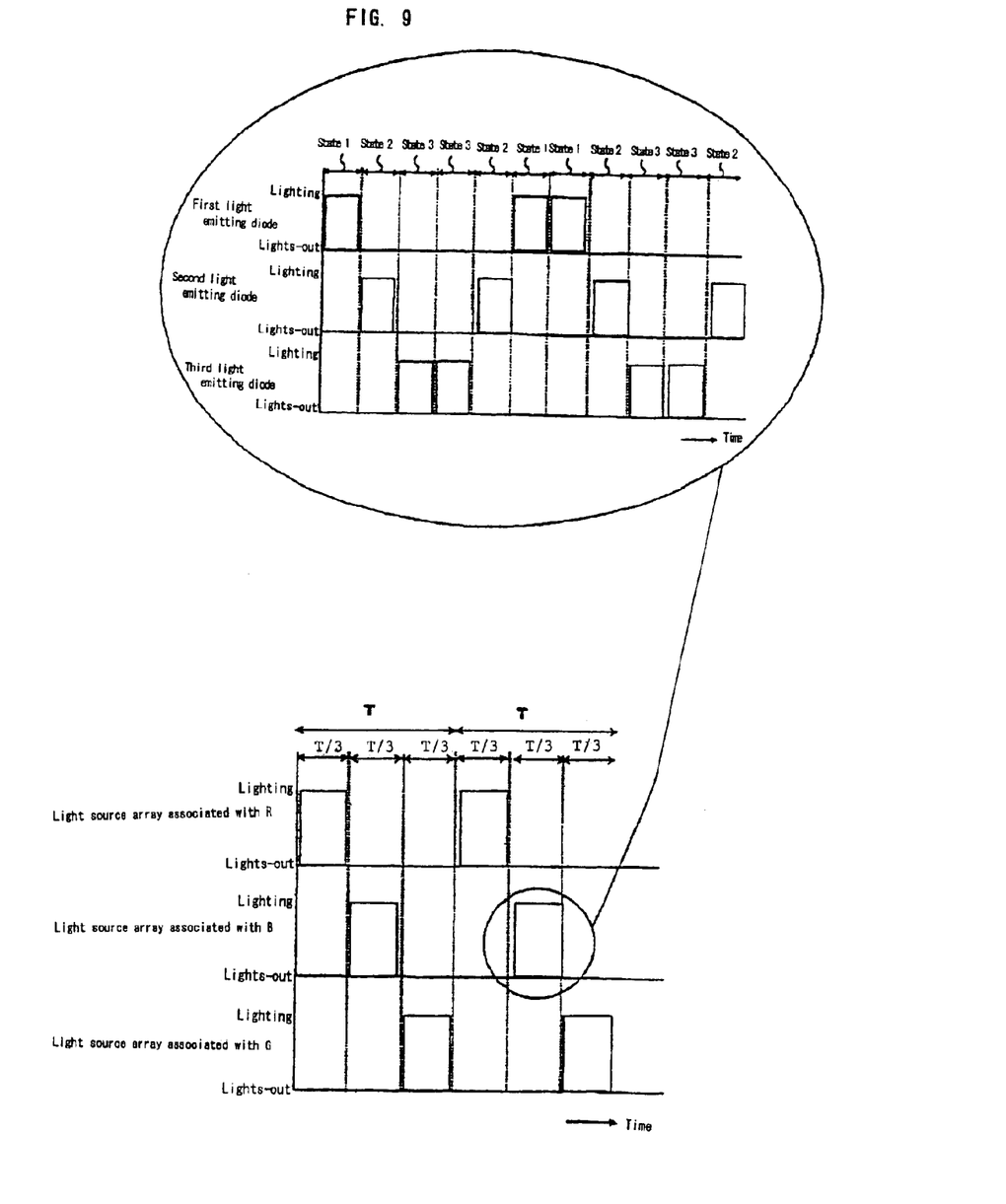
FIG. 9 is a timing chart showing lighting/lights-out timings for light source arrays 701, 702, 703 when they are associated with R, B, G, respectively, in a projection display device according to another embodiment of the present invention.

FIG. 9 is a timing chart showing lighting/lights-out timings for light source arrays 701, 702, 703 when they are associated with R, B, G colors, respectively, in the projection display device according to another embodiment of the present invention. Assuming now that a sequence of transitions R=>B=>G appears in duration T, each of light source arrays 701, 702, 703 associated with R, B, G colors is lit for T/3. In other words, light source arrays 701, 702, 703 are lit as shown in the timing chart of FIG. 9.

In this way, time-division color light flux from light source arrays 701, 702, 703 passes through cross dichroic prism 712, second fly-eye lens 707, field lens 708, and prism 709 to illuminate DMD 710, so that an image modulated by DMD 710 is enlarged and projected onto a screen (not shown) by projection lens 711.

In the foregoing embodiment of the projection display device according to the present invention, three light emitting diode elements in the same color are provided for one elemental lens of the fly-eye lens. Consequently, the luminance can be increased substantially by a factor of three without incurring an increase in the size of the light source arrays, as compared with the prior art display device which comprises the same number of elemental lenses in fly-eye lenses as light emitting diode elements. As mentioned above, five light emitting diode elements in the same color may be provided for one elemental lens in the fly-eye lens, in which case the luminance can be further increased.

Also, while the foregoing embodiment of the projection display device according to the present invention has been shown in a single plate configuration, given as an example, which comprises a single two-dimensional light modulator, the display device of the present invention may be implemented in a three-plate configuration other than the single plate configuration.

While several embodiments of the present invention have been described in detail, the foregoing embodiments merely represent preferred embodiments of the present invention, and the present invention is not limited to those embodiments but may be modified in various manners without departing from the spirit and scope of the invention.

What is claimed is:

1. A projection display device comprising:
   a light source array including a plurality of light emitting diode element arrays, each said light emitting diode element array being composed of a plurality of light emitting diode elements as a light source for generating light flux;
   an illumination optical system including a pair of a first fly-eye lens and a second fly-eye lens, said first and second fly-eye lenses having the same optical axis;
   a two-dimensional light modulator illuminated by said illumination optical system for modulating image light;
   a projection lens for enlarging and projecting the modulated image light onto a screen; and
   a light source array moving mechanism for reciprocating an entirety of said light source array within a plane perpendicular to the optical axis of said first fly-eye lens.

2. The projection display device according to claim 1, wherein:
   each of said first and second fly-eye lenses comprises a plurality of rectangular elemental lenses assembled in an array form, said elemental lenses being identical in quantity to said light emitting diode element arrays; and
   a light emitting diode element within said light emitting diode element array of said light source array is turned on when a center of said light emitting diode element substantially aligns with the optical axis of an elemental lens of said first fly-eye lens closer to said light source array, and said light emitting diode element is turned off when the center thereof is not substantially in alignment with the optical axis.

3. A projection display device comprising:
   a light source array including a plurality of light emitting diode element arrays, each said light emitting diode element array being composed of a plurality of light emitting diode elements as a light source for generating light flux;
   an illumination optical system including a pair of a first fly-eye lens and a second fly-eye lens, said first and second fly-eye lenses having the same optical axis, each of said first and second fly-eye lenses including a plurality of rectangular elemental lenses assembled in an array form, said elemental lenses being identical in quantity to said light emitting diode element arrays;

a two-dimensional light modulator illuminated by said illumination optical system for modulating image light;

a projection lens for enlarging and projecting the modulated image light onto a screen;

a light source array moving mechanism for reciprocating an entirety of said light source array within a plane perpendicular to the optical axis of said first fly-eye lens, such that a light emitting diode element within said light emitting diode element array of said light source array is turned on when a center of said light emitting diode element substantially aligns with the optical axis of an elemental lens of said first fly-eye lens closer to said light source array, and said light emitting diode element is turned off when the center thereof is not substantially in alignment with the optical axis; and control means for controlling to turn on/off each of said light emitting diode elements within said light emitting diode element arrays.

4. A projection display device comprising:

three light source arrays independent of one another and associated with R, B, G colors, respectively, each said light source array including a plurality of light emitting diode element arrays, each said light emitting diode element array being composed of a plurality of light emitting diode elements;

an illumination optical system including first fly-eye lenses connected to said three light source arrays, respectively, a cross dichroic prism for combining light flux formed by said three light source arrays through said first fly-eye lenses associated therewith, and a second fly-eye lens, each of said first fly-eye lenses and said second fly-eye lens including a plurality of rectangular elemental lenses assembled in an array form, said elemental lenses being identical in quantity to said light emitting diode element arrays;

a two-dimensional light modulator illuminated by said illumination optical system for modulating image light;

a projection lens for enlarging and projecting the modulated image light onto a screen;

three light source array moving mechanisms associated with said three light source arrays, respectively, each for reciprocating one of said light source arrays associated therewith within a plane perpendicular to an optical axis of said first fly-eye lens associated therewith, such that a light emitting diode element within said light emitting diode element array in each of said three light source arrays is turned on when the center of said light emitting diode element substantially aligns with the optical axis of an elemental lens of said first fly-eye lens closer to each of said three light source arrays, and said light emitting diode element is turned off when the center thereof is not substantially in alignment with the optical axis; and control means for controlling to turn on/off each of said light emitting diode elements within said light emitting diode element arrays in said three light source arrays.

5. The projection display device according to claim 1, wherein each said light emitting diode element array comprises three or more light emitting diode elements.

6. The projection display device according to claim 2, wherein each said light emitting diode element array comprises three or more light emitting diode elements.

7. The projection display device according to claim 3, wherein each said light emitting diode element array comprises three or more light emitting diode elements.

8. The projection display device according to claim 5, wherein each said light emitting diode element array comprises three light emitting diode elements which emit light in red, blue, and green, respectively.

9. The projection display device according to claim 6, wherein each said light emitting diode element array comprises three light emitting diode elements which emit light in red, blue, and green, respectively.

10. The projection display device according to claim 7, wherein each said light emitting diode element array comprises three light emitting diode elements which emit light in red, blue, and green, respectively.

11. The projection display device according to claim 5, wherein each said light emitting diode element array comprises three light emitting diode elements which emit light in a same color.

12. The projection display device according to claim 6, wherein each said light emitting diode element array comprises three light emitting diode elements which emit light in a same color.

13. The projection display device according to claim 7, wherein each said light emitting diode element array comprises three light emitting diode elements which emit light in a same color.

14. The projection display device according to claim 5, wherein each said light emitting diode element array comprises more than three light emitting diode elements, three of which are light emitting diode elements that emit light in red, blue, and green, respectively, and the rest of which are light emitting diode elements selected from light emitting diode elements that emit light in red, blue, and green.

15. The projection display device according to claim 6, wherein each said light emitting diode element array comprises more than three light emitting diode elements, three of which are light emitting diode elements that emit light in red, blue, and green, respectively, and the rest of which are light emitting diode elements selected from light emitting diode elements that emit light in red, blue, and green.

16. The projection display device according to claim 7, wherein each said light emitting diode element array comprises more than three light emitting diode elements, three of which are light emitting diode elements that emit light in red, blue, and green, respectively, and the rest of which are light emitting diode elements selected from light emitting diode elements that emit light in red, blue, and green.

17. The projection display device according to claim 5, wherein each said light emitting diode element array comprises more than three light emitting diode elements, wherein said light emitting diode elements in excess of three are light emitting diode elements that emit light in the same color.

18. The projection display device according to claim 6, wherein each said light emitting diode element array comprises more than three light emitting diode elements, wherein said light emitting diode elements in excess of three are light emitting diode elements that emit light in the same color.

19. The projection display device according to claim 7, wherein each said light emitting diode element array comprises more than three light emitting diode elements, wherein said light emitting diode elements in excess of three are light emitting diode elements that emit light in the same color.

20. The projection display device according to claim 4, wherein:

each said light emitting diode element array comprises three or more light emitting diode elements;

said light emitting diode elements making up said light emitting diode element array forming part of said light source array associated with R color comprise light emitting diodes, all of which emit light in red;

said light emitting diode elements making up said light emitting diode element array forming part of said light source array associated with B color comprise light emitting diodes, all of which emit light in blue; and said light emitting diode elements making up said light emitting diode element array forming part of said light source array associated with G color comprise light emitting diodes, all of which emit light in green.

* * * * *